United States Patent [19]
Kou

[11] Patent Number: 5,355,490
[45] Date of Patent: Oct. 11, 1994

[54] SYSTEM AND METHOD FOR SAVING THE STATE FOR ADVANCED MICROPROCESSOR OPERATING MODES

[75] Inventor: James T. L. Kou, Corona, Calif.

[73] Assignee: Toshiba America Information Systems, Inc., Irvine, Calif.

[21] Appl. No.: 712,972

[22] Filed: Jun. 14, 1991

[51] Int. Cl.$^5$ .......................... G06F 1/28; G06F 1/30
[52] U.S. Cl. ............... 395/700; 364/DIG. 1; 364/273.4; 395/750
[58] Field of Search ................ 395/650, 700, 400, 425

[56] References Cited

U.S. PATENT DOCUMENTS

| | | | |
|---|---|---|---|
| 4,143,283 | 3/1979 | Graf et al. | 307/66 |
| 4,234,920 | 11/1980 | Van Ness et al. | 364/200 |
| 4,458,307 | 7/1984 | McAnlis et al. | 364/200 |
| 4,639,864 | 1/1987 | Katzman et al. | |
| 4,709,324 | 11/1987 | Kloker | 364/200 |
| 4,747,040 | 5/1988 | Blanset et al. | 395/650 |
| 4,779,187 | 10/1988 | Letwin | 364/200 |
| 4,825,358 | 4/1989 | Letwin | 364/200 |
| 4,907,150 | 3/1990 | Arroyo et al. | 364/200 |
| 5,027,273 | 6/1991 | Letwin | 395/400 |
| 5,125,087 | 6/1992 | Randell | 395/425 |
| 5,167,024 | 11/1992 | Smith et al. | 395/375 |
| 5,175,853 | 12/1992 | Kardach et al. | 395/650 |
| 5,193,161 | 3/1993 | Bealkowski et al. | 395/400 |
| 5,218,607 | 6/1993 | Saito et al. | 371/66 |
| 5,230,074 | 7/1993 | Canova, Jr. et al. | 395/750 |
| 5,237,692 | 8/1993 | Raasch et al. | 395/725 |
| 5,241,680 | 8/1993 | Cole et al. | 395/750 |

OTHER PUBLICATIONS

T3100SX Portable Personal Computer Reference Manual, published by Toshiba America Information Systems.

Primary Examiner—Gareth D. Shaw
Assistant Examiner—M. Richey
Attorney, Agent, or Firm—Banner, Birch, McKie & Beckett

[57] ABSTRACT

In accordance with the present invention, a resume processing driver for an advanced microprocessor, such as the Intel 80386 operating in enhanced mode, is provided which saves data indicative of the operating conditions of the advanced microprocessor into system memory and then calls a previously existing resume processing routine designed for a previously existing operating system, such as MS-DOS operating in real mode. The previously existing resume processing routine performs additional processing in order to save operating condition data associated with the previously existing operating system into system memory, and then performs a controlled power off sequence and removes the power supplied to all elements of the computer except the computer memory. Thereafter, the existing resume processing routine performs processing to restore the operating condition data associated with the previously existing operating system from system memory and then passes control to the resume processing driver of the present invention. The resume processing driver restores the data indicative of the operating conditions of the advanced microprocessor from system memory, and control then passes to the computer program which was executing before the resume processing driver was initiated. In addition, in another embodiment, the present invention is able to properly switch from the enhanced mode to the real mode and then back to the enhanced mode for use in applications other than resume functions.

31 Claims, 7 Drawing Sheets

SYSTEM AND METHOD FOR SAVING THE STATE FOR ADVANCED MICROPROCESSOR OPERATING MODES

BACKGROUND OF THE INVENTION

1. Field of the Invention

The present invention generally relates to a resume processing control system for use in a computer system, and more particularly, to a method for saving the status of a computer system operating under the Microsoft Windows operating environment in response to a power-off signal, removing power from the computer system, and subsequently re-applying power to the computer system so that the computer system returns to its original state.

2. Description of the Prior Art

In a conventional computer system, such as an "IBM compatible" microcomputer based upon an 80×86 microprocessor or equivalent, the contents of registers and memory locations associated with the underlying microprocessor are generally lost when the power is removed from the system. Thereafter, when power is restored to the computer system, the system executes initialization steps to place the system in an initial state. In this case, any computer program and accompanying data existing within the system before the power was removed must be re-loaded.

In recent years, "resume" functionality has been added to certain computer systems—most notably the Toshiba line of laptop microcomputers—to allow the computer system to save its operating conditions before power is removed, and to resume processing at the same point when power is subsequently restored. This functionality is accomplished by maintaining a supply of power to the computer's low-power dynamic memory while removing such power to the devices requiring a larger amount of power, such as the display and the disk drives. This power consumption preservation functionality allows computer systems which posses only a limited power supply, such as battery operated laptop computers, to maintain the current state of the computer system while minimizing the amount of necessary power consumption.

For example, the built-in resume feature found on the Toshiba line of laptop computers (referred to as "AutoResume" on these machines) allows the user to power off the computer (thus saving battery power) without losing data. This functionality is built into the Basic Input/Output System (BIOS) routines found within the computer's read-only memory (ROM). These BIOS resume routines are called after a power-down request is received by the underlying microprocessor in the form of a non-maskable interrupt (NMI). The resume function is accomplished by saving all necessary register information into random access memory (RAM) and retaining power to that memory while disabling power to the other computer devices. When normal power is restored, the saved information is returned to the registers and the machine is returned to its previous state.

This feature is useful if the user intentionally shuts down the machine to preserve battery life, but an added benefit occurs when the battery power reaches a critically low level. At this point, the machine will warn the user (e.g. by beeping) that the batteries are near depletion. If the user fails to shut down the machine within a given amount of time (approximately five minutes), the computer will automatically go into "resume mode" and shut itself off. When normal power is re-applied, the BIOS will restore the computer to its original state with no loss of data and without any interruption in execution of the previously running program.

Unfortunately, the resume processing BIOS code presently built into such laptops supports the resume function under the basic MS-DOS operating system only while the microprocessor is operating in the "real mode". When run under a different operating environment, such as the Windows operating environment which is a graphical user interface available from Microsoft Corporation of Redmond, Wash., the present BIOS resume function does not properly save certain registers and other data used by the microprocessor, and the resume function operation thereby fails. This is due, in part, to the fact that the Windows operating environment was designed to operate on a computer system utilizing a multi-mode 80386 microprocessor operating in an advanced mode, such as the "enhanced mode", or a microprocessor downwardly compatible with the 80386, such as the 80486, etc. On the other hand, the MS-DOS operating system was designed to operate on an 8086/8088 microprocessor utilizing only one "real" mode.

As a result, in order to utilize the existing resume processing BIOS present in such computers, a "wrapper" must be created around the BIOS to place the computer into a state upon which the BIOS may perform its resume processing functions. The present invention is designed to perform such functionality.

SUMMARY OF THE INVENTION

Accordingly, it is an object of the present invention to provide a resume processing function for use with an advanced operating environment such as Windows.

It is a further objective of the present invention to provide a resume processing function for use with an advanced microprocessor, such as the Intel 80386, operating in its enhanced mode.

It is a further objective of the present invention to provide a resume processing function for use in the enhanced mode of a microprocessor in conjunction with an existing resume processing routine, such as the MS-DOS resume processing BIOS routine.

It is yet another object of the present invention to provide a resume processing function which acts as a "wrapper" around an existing resume processing routine.

It is yet another object of the present invention to provide a resume processing function which saves data indicative of the advanced microprocessor operating in the enhanced mode before an existing resume processing routine is called.

It is yet another object of the present invention to provide a resume processing function which restores data indicative of the advanced microprocessor's operating conditions after an existing resume processing routine has been executed.

It is yet another object of the present invention to provide a process for switching from an advanced mode of a microprocessor, such as the enhanced mode of the 80386 microprocessor, to a base mode of a microprocessor, such as the real mode of the 80386 microprocessor, executing a computer program designed to operate in the base mode, and subsequently switching back to the advanced mode.

In accordance with the present invention, a resume processing driver for an advanced microprocessor, such as the Intel 80386 operating in enhanced mode, is provided which saves data indicative of the operating conditions of the advanced microprocessor into system memory and then calls a previously existing resume processing routine designed for a previously existing operating system, such as MS-DOS operating in real mode. The previously existing resume processing routine performs additional processing in order to save operating condition data associated with the previously existing operating system into system memory, and then performs a controlled power off sequence and removes the power supplied to all elements of the computer except the computer memory. Thereafter, the existing resume processing routine performs processing to restore the operating condition data associated with the previously existing operating system from system memory and then passes control to the resume processing driver of the present invention. The resume processing driver restores the data indicative of the operating conditions of the advanced microprocessor from system memory, and control then passes to the computer program which was executing before the resume processing driver was initiated. In addition, in another embodiment, the present invention is able to properly switch from the enhanced mode to the real mode and then back to the enhanced mode for use in applications other than resume functions.

DETAILED DESCRIPTION

In order to appreciate the detailed discussion that follows, the following terms will now be defined:

CPU: The central processing unit is a microprocessor which forms the central control circuitry in the computer system. For purposes of the present invention, the CPU comprises a microprocessor which is capable of operating in advanced operational modes, such as an enhanced mode, and which is capable of running an advanced operating environment, such as Windows Version 3.0.

DESCRIPTOR TABLE: A descriptor table is a table that maps selectors to physical memory addresses. Such tables are used by advanced microprocessors, such as the Intel 80386, to define segments of memory for a computer program's use. There are three types of tables which are relevant to the present invention: The local descriptor table (LDT), the global descriptor table (GDT), and the interrupt descriptor table (IDT). An LDT exists for each active process and allows access to memory that is owned or shared by that process. The GDT allows access to memory that is used by the operating system and device drivers. Tile IDT stores vectors corresponding to the plurality of available interrupts.

ENHANCED MODE: For purposes of the present invention, the term enhanced mode refers to the "virtual 8086" or "386 protected mode" (also known as "386 protect mode") of the 80386 microprocessor, or analogous mode(s) of a similar microprocessor.

HOOK or HOOKING an Interrupt: Hooking an interrupt refers to the act of redirecting the CPU to access a new interrupt handler. The actual "hook" must be performed before the interrupt occurs. This is typically done by placing the address of the new handler in the appropriate location in an interrupt vector table or an interrupt descriptor table.

I/O CHANNEL CHECK or PARITY ERROR: This is a fatal system error caused by an expansion board detecting an I/O parity error in the hardware.

NMI: A non-maskable interrupt is one that cannot be ignored by the CPU, although it may be masked off external to the CPU. For example, on the Toshiba T3100SX or T2000SX laptop computer, there are two ways an NMI may be generated: (1) by an I/O channel check error, or (2) by a power down request as described according to the present invention.

RESUME or RESUMING: Resuming is the act of shutting off power to the computer (except for memory) and restoring it at a later date while preserving the software state of the machine.

SELECTOR: A selector is a value that is used in the protected mode of an advanced microprocessor, such as the 80386-compatible line of microprocessor, which can be loaded into a segment register to reference a physical memory segment. The selector is used as an index into a descriptor table (either the LDT or the GDT).

In a preferred embodiment, the implementation of the present invention involves developing a Windows Version 3.0 device driver for use with the enhanced mode of the Intel 80386-compatible microprocessor. The device driver is designed to "hook" the non-maskable interrupt (NMI) (interrupt 2) so that the driver is executed whenever an NMI occurs. The basic functioning of the resume driver of the present invention is to provide the necessary resume processing to save registers and data associated with the enhanced mode of the microprocessor before a pre-existing resume BIOS handler is called. This processing generally includes the sequential switching of microprocessor operating modes until the real mode is switched, and subsequently executing the BIOS handler which performs its processing and removes the respective power from the computer system. Thereafter, when the power is restored, the pre-existing resume BIOS handler finishes its execution and returns control to the resume driver of the present invention which restores all of the previously saved registers and data.

The resume driver according to a preferred embodiment of the present invention comprises (1) driver initialization code and (2) driver runtime code. As will be explained in the detailed discussion below, the device driver must be written in order to fully support the resume function according to the present invention, but it will be readily understood by one of ordinary skill in the art that the described modifications and additions will define only one implementation of the present claimed invention, and that other obvious variations will be apparent from the discussion.

As will also be readily understood by one skilled in the art of computer programming, the above components may be implemented by writing or modifying computer programs written in one of a variety of computer languages. In the preferred embodiment, 80386-compatible assembly language (machine language) is used to implement the present invention, because the present invention is being implemented as a Windows device driver for use in an 80386-compatible operating mode. However, when implementing the resume driver, for example, any other suitable language could also conceivably be used. In the context of this detailed description, it will be assumed that assembly language is being used, unless otherwise noted.

Also, the Microsoft Macro Assembler Version 5.10B and the Microsoft Segmented-Executable Linker Version 5.03 (both available from Microsoft Corporation of Redmond, Wash.) may be used to assemble and link the device driver and other source code of the present invention in a preferred embodiment, although other similar products could also be used.

In order to install the resume driver of the present invention, steps must be taken so that Windows recognizes that the resume driver is present and installs the driver. This may be accomplished, in a preferred embodiment, by editing the [386ENH] section of the "SYSTEM.INI" file by inserting a "DEVICE=" line to point to the device driver. For example, if the device driver file is named "BIOSXLAT.386", as it is in a preferred embodiment, then the following line would be added:

DEVICE=BIOSXLAT.386

Of course, the actual device driver (e.g. BIOSXLAT.386) would then have to be copied to the Windows SYSTEM subdirectory.

Several reference works available to those skilled in the art may prove useful when implementing the present invention. Specifically, the following references describe in much detail various aspects of implementing the present invention: "Intel 386 DX Programmer's Reference Manual" (Order #: 230985-003), Intel 80386 System Software Writer's Guide" (Order #: 231499-001), both available from Intel Corporation; "Microsoft Windows Device Development Kit, virtual Device Adaptation Guide, Version 3.0", "The MS-DOS Encyclopedia", "Microsoft Windows Software Development Kit, Reference Vols. 1-2", all available from Microsoft Corporation; and "Toshiba T3100SX Personal Computer Technical Reference Manual", "Toshiba T3100SX Personal Computer BIOS specification", both available from Toshiba Corporation. Although one of ordinary skill in the art would be able to implement the present invention without the aid of these books, their use as reference works could prove useful. With respect to the Microsoft Windows Device Development Kit", this kit, available from Microsoft, is useful in developing device drivers for use with Windows, as is done in a preferred embodiment of the present invention.

Figure 1:
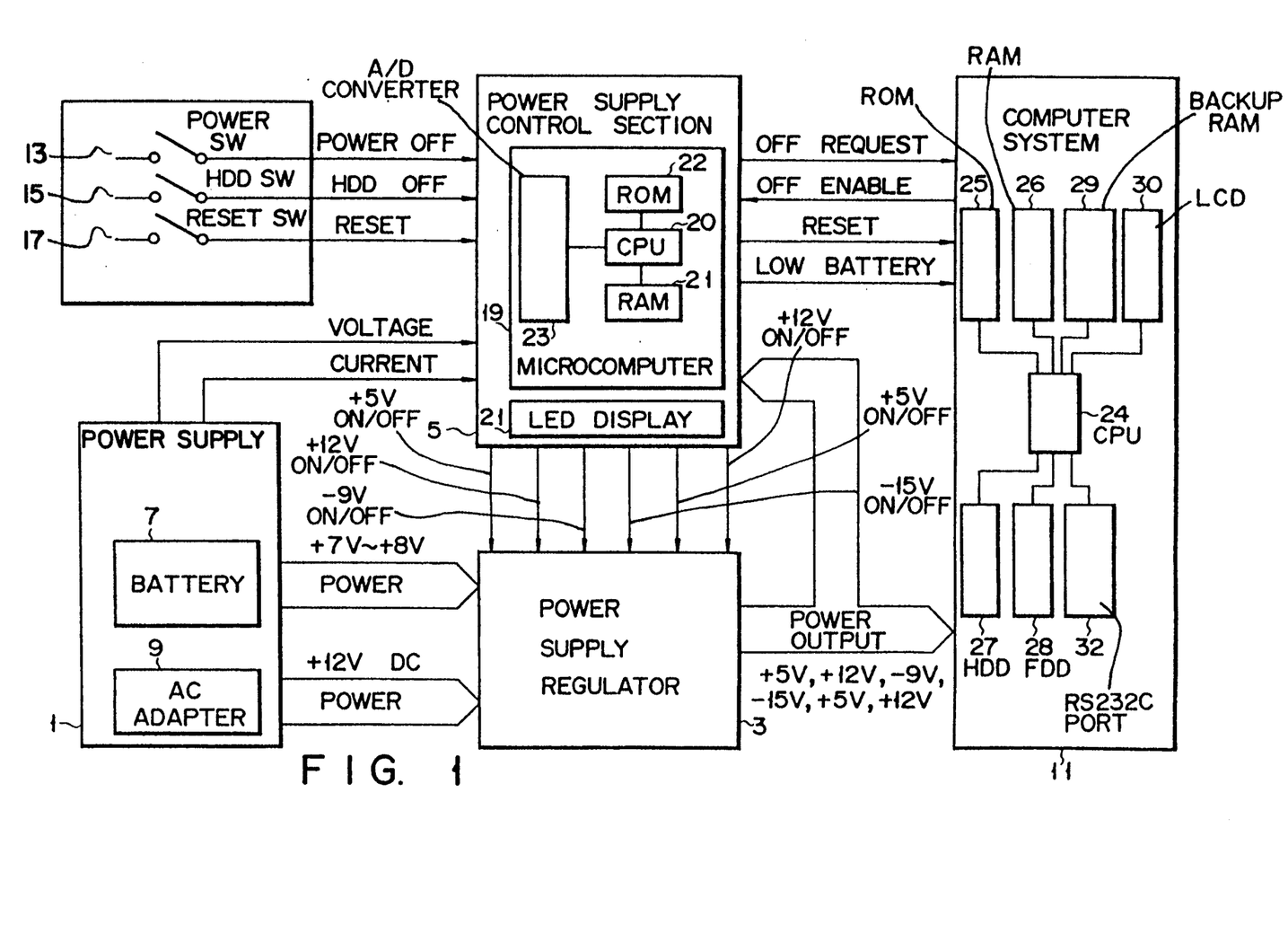
FIG. 1 is a block diagram showing the various components of a computer with which the resume device driver of the present invention may operate in a preferred embodiment.

FIG. 1 is a block diagram corresponding to a microcomputer with which the present invention may operate in a preferred embodiment. The specific microcomputer portrayed in FIG. 1 may be any one of a variety of microcomputers possessing an "intelligent" power supply and possessing an advanced microprocessor capable of operating in an enhanced mode, such as the Toshiba T3100SX or T2000SX "laptop" computers. While the specific configuration shown in this figure may vary from computer to computer, the relevant portions of the computer system necessary to the operation of the present invention (including the "intelligent" power supply) will remain essentially the same, and therefore, it will be understood that FIG. 1 is included for illustrative purposes only.

Referring to FIG. 1, central processing unit (CPU) 24, which in a preferred embodiment may consist of an Intel 80386-compatible microprocessor capable of running in an "enhanced" mode, controls the functioning of the entire computer system 11 of FIG. 1. In the preferred embodiment, CPU 24 performs the functions outlined in the flowcharts of FIGS. 2(a)-2(g), which will be described in detail below. In addition, CPU 24 serves as a host CPU relative to power supply control CPU 20 which forms the heart of power supply control section 5, which will also be described in detail below.

Read-Only Memory (ROM) 25 stores fixed computer programs and accompanying data, including the ROM Basic Input/Output System (BIOS) (not explicitly shown). In a preferred embodiment, the ROM BIOS stores a resume processing program which is capable of operating with the real mode of CPU 24. For example, the T3100SX laptop computer available from Toshiba Corporation utilizes the 80386SX microprocessor as CPU 24 and possesses a resume processing program within its ROM 25 which is designed to operate when the 80386SX microprocessor is in its real mode.

Random Access Memory (RAM) 26 stores modifiable programs and data to be processed by CPU 24. In addition, RAM 24 stores a resume mode flag which indicates to an executing program whether resume processing should be utilized. This flag will be discussed in detail below.

A hard disk drive 27 may be removably inserted in a dedicated housing section of the main body of the microcomputer system, and in a preferred embodiment comprises a 3.5 inch hard disk drive (HDD) and a hard disk controller (HDC) (not explicitly shown) for controlling access to the drive. Likewise, floppy disk drive (FDD) 28 may be utilized in a preferred embodiment for reading and writing to removable magnetic media (not explicitly shown). Also. RS-232C port 32 may be utilized in a preferred embodiment for serial communications. Finally, liquid crystal display (LCD) 30 is used for visual output to the user.

Power supply control section 5 includes a CPU 20 for controlling overall operation of this circuit. RAM 21 and ROM 22 are used in conjunction with CPU 20 in order to perform the steps necessary to control the power supply, as descried below. Analog-to-digital (A/D) converter 23 is connected to CPU 20 and supplies signals from switches 13, 15 and 17 to CPU 20. Elements 20, 21, 22, and 23 comprise microcomputer 19 of the power supply control section 5. Finally, light-emitting diode (LED) display 21 provides visual indication to the user whether the power supply control section is active or not.

Power supply control section 5 supplies the "OFF REQUEST", "RESET", and "LOW BATTERY" signals to computer system 11. The "OFF REQUEST" and "LOW BATTERY" signals are provided to the computer system 11 in the form of non-maskable interrupts (NMI) and initiate the resume processing function of the present invention if it is enabled. The "RESET" signal indicates to the computer system 11 that a cold boot is requested. Finally, "OFF ENABLE" is provided from computer system 11 to power supply control section 5 to indicate that the power-off process may be performed.

The power supply control section 5 also provides six (6) power levels to the power supply regulator 3, which in turn provides these power levels to computer system 11 and power supply control section 5.

Power supply 1 supplies two levels of power to power supply regulator 3. Power supply 1 comprises battery 7 and alternating current (AC) adapter 9. AC adapter 9 may be connected to a standard wall power outlet to provide power to power supply 1, and battery 7 may provide direct current (DC) to power supply 1. In addition, power supply 1 provides "VOLTAGE" and "CURRENT" indications to power supply control section 5 corresponding to its current operating conditions.

Switches 13, 15 and 17 are connected to power supply control section 5. Power switch (POWER SW) 13 indicates to power supply control section 5 that a power-down process is requested by the user. Hard disk drive switch (HDD SW) 15 indicates to power supply control section 5 whether hard disk drive 27 is to be operational. Finally, Reset switch (RESET SW) 17 indicates to power supply control section 5 that a cold boot is to be performed by computer system 11.

Referring to FIGS. 2(a)–2(g), a flow diagram is shown depicting the operation of the resume processing function according to a preferred embodiment of the present invention. While this flow diagram indicates a specific sequence which may be followed in order to implement the present invention, it will be understood by one of ordinary skill in the art that a multitude of variations may be made to this sequence while accomplishing the same overall function.

Figure 2A:
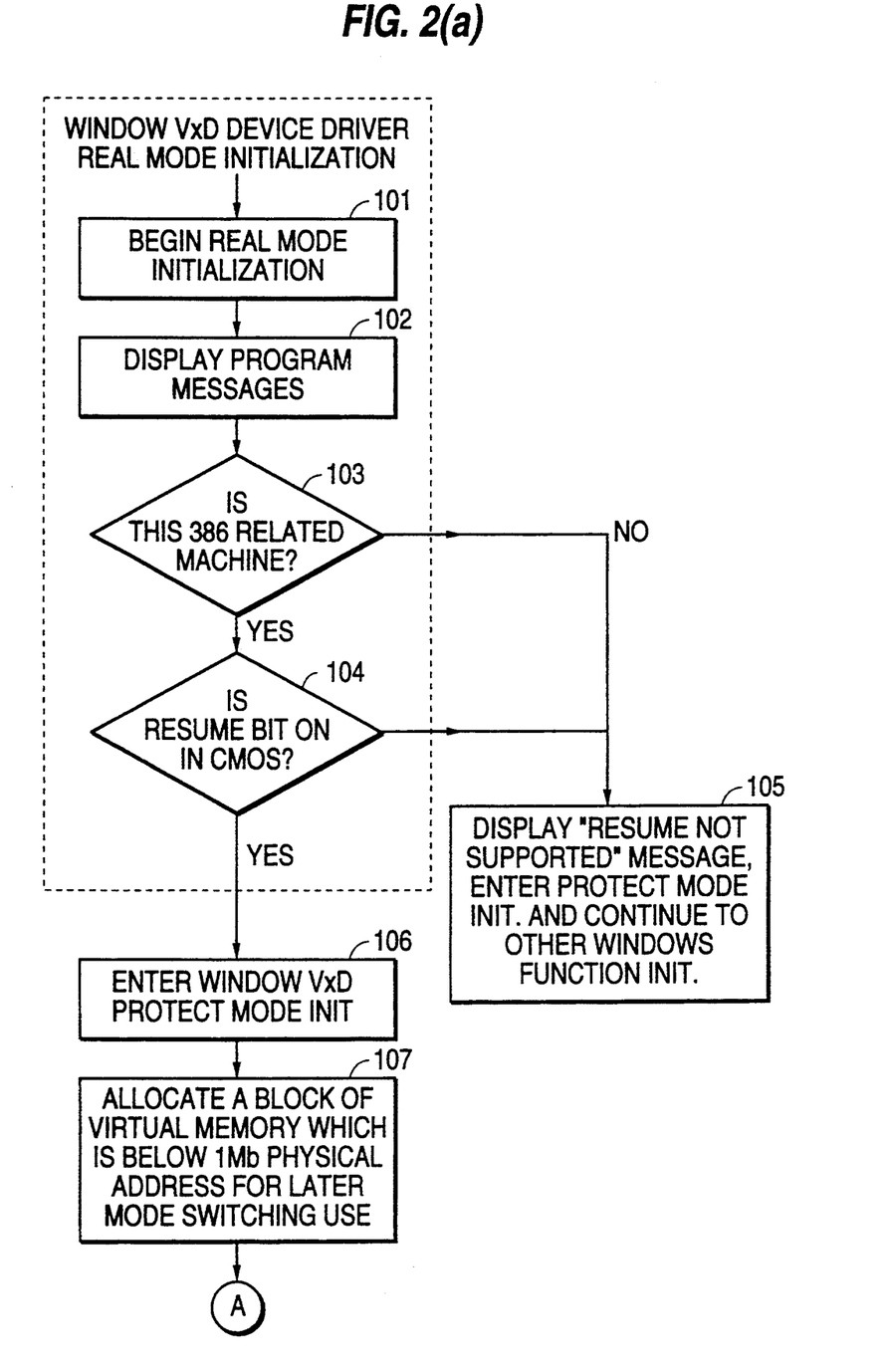
FIGS. 2(a)-2(g) are flow diagrams showing the various steps which are performed when the resume driver of the present invention is invoked.
Figure 2B:
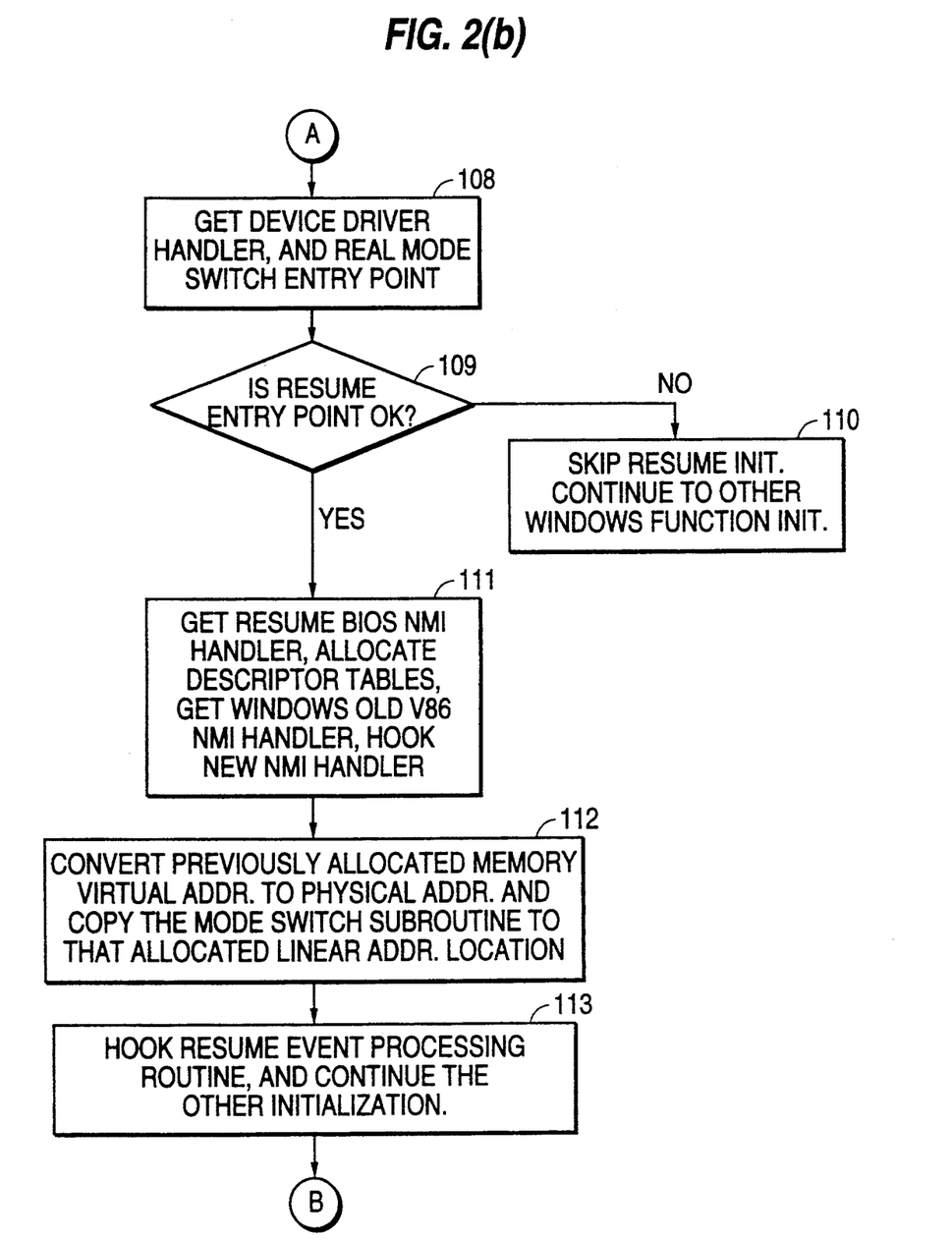

Referring to FIGS. 2(a)–2(b), an initialization sequence is shown according to a preferred embodiment of the present invention. This sequence is executed at Windows load time, and the underlying initialization routine memory space is thereafter "discarded" (e.g. the memory is freed up for other uses). The initialization sequence acts to determine whether the host computer system (shown in FIG. 1) can support the resume function of the present invention, as well as related initialization functions, as described in detail below.

Referring to FIG. 2(a), step 101 consists of the point at which the Windows environment begins its real mode initialization sequence. As indicated previously, this step correspond to the standard Windows device driver loading sequence performed by Windows when the file name of the resume device driver of the present invention is placed in the appropriate location in the "SYSTEM.IN" file. Thereafter, the Windows device driver loader reads this line and loads the resume driver according to its standard process.

Steps 102–113 outline the actual initialization steps performed in order to properly install the resume driver. Step 102 refers to the process of displaying program messages, such as copyright information, to the user of the computer system. While this step is not necessary to the successful operation of the present invention, it is included in a preferred embodiment so as to adequately signify that the underlying program code is of a copyrighted nature. This step mat be accomplished through ordinary BIOS or DOS character string output routines, such as subfunction 9 (hex) of interrupt 21 (hex).

Step 103 consists of determining whether the host CPU is an appropriate type (e.g. a 80386). Because the present invention, in a preferred embodiment, is designed to operate on an Intel 80386-compatible microprocessor, the resume driver must determine whether an 80386-compatible microprocessor is actually present. On a Toshiba laptop computer used in a preferred embodiment, such as the T3100SX, special memory address locations may be examined in order to make this determination. Specifically, the two bytes located starting at address 0F000:E024 (hex) (segment:offset) will contain the ASCII letters "R" and "0" if the machine is a T3100SX (and hence uses the 80386SX microprocessor). In this case, if these ASCII values are found at these locations, then it is safe to assume that the present resume driver will operate on this machine. For machines made by other than Toshiba, similar determinations may be made according to the specific manufactures specifications.

Step 104 consists of determining whether the resume bit is set within the non-volatle CMOS memory locations indicating that the resume mode is to be active. Because the user may selectively turn on and off the operation of the resume functionality, this bit must be checked before loading the resume driver of the present invention. If this bit is set so as to indicate that resume processing is not activated, then there is no need to load the resume driver.

On a T3100SX computer in a preferred embodiment, the CMOS resume bit may be checked by loading the CMOS resume address (e.g. 39 hex) into a register (e.g. AL), and sending this address to the appropriate port (e.g. to port 70 (hex) with the "OUT" instruction). Thereafter, the appropriate data may be read in from a CMOS I/O port (e.g. port 71 hex) with an appropriate instruction (e.g. the "IN" instruction). If the resume bit is not set (e.g. bit 1), then step 105 is executed.

Step 105 corresponds to the situation where either the host microprocessor is not an 80386 (as determined in step 103) or the CMOS resume bit is not set (as determined in step 104). In either of these two situations, the user should be notified that the resume driver of the present invention is not supported. Thereafter, the normal Windows protected mode initialization sequence is performed as well as other normal Windows initialization functions. The result of this will be that the present invention will not be loaded and implemented.

Assuming that both of the determinations of step 103 and 104 are satisfied, the real mode initialization steps are then complete. At this point, the Windows loader should continue loading the protected mode portion and the remaining portions of the resume driver of the present invention.

Step 106 corresponds to the beginning of the Windows resume device driver protected mode initialization, described below. Step 107 consists of the sequence of allocating a block of virtual memory below the 1 MByte physical address for later mode switching use. Specifically, this sequence is performed in order to allocate virtual memory to which step 112 (described later) may copy the actual mode switch subroutine. This must be performed because the resume driver of the present invention by definition resides above the 1 MByte address location, and the microprocessor operating in the real mode does not have access to memory above this address.

Referring to FIG. 2(b), step 108 is next executed (the encircled "A" at the bottom of FIG. 2(a) and at the top of FIG. 2(b) indicates a continuum between figures. Hereinafter, such notation is used to indicate the continuum between the various figures). Step 108 consists of (1) obtaining the address of the resume device driver handler of the present invention and (2) obtaining the address of the BIOS resume handler routine (e.g. the resume handler previously found in the computer's BIOS which is operable in the real mode). The address of resume driver handler of the present invention may be directly obtained from the loaded resume driver code, while the address of the BIOS resume handler routine may be obtained, in a preferred embodiment, as a vector from special memory locations storing such address. Specifically, on the T3100SX of the preferred embodiment, the two double word (e.g. four bytes) memory locations immediately following the "R" and "0" ASCII bytes described above contain the address of the BIOS resume handler. Of course, on other machines, the appropriate memory locations would be utilized.

Step 109 consists of an additional check to determine if the resume driver of the present invention may be utilized, and therefore to determine whether the resume driver should be loaded. The vector referred to above which supposedly points to the BIOS resume handler may be examined in order to determine if it has the value of zero (0). If so, then this vector presumable does not actually correspond to a pointer into a BIOS resume handler, and the resume driver is not loaded and used. In this case, control is transferred to step 110. Step 110 simply skips the remaining resume driver initialization according to the present invention, and instead transfers control directly to the remaining standard Windows initialization sequences.

If the resume entry point is proper, then control is passed to step 111. Step 111 consists of (1) obtaining the segment and offset of the BIOS resume handler (which, in a preferred embodiment, may be previously obtained by examination of the above-mention vector while the present invention was operating in its real mode initialization sequence) and saving it into a previously defined memory location, (2) allocating a dummy global descriptor table (GDT) for use in switching from protected mode to real mode (described in more detail later), (3) obtaining the old NMI handler address, and (4) "hooking" the resume device driver of the present invention as the new NMI handler.

The dummy GDT may be allocated by using the "_Allocate_Global_V86_Date_area" function of the special Virtual Machine Manager call, "VMMcall", which forms a part of the Microsoft Windows Device Development Kit, Version 3.0, available from Microsoft Corporation of Redmond, Wash. Such VMM calls may be implemented by first "including" the "VMM.INC" and/or "V86MMGR.INC" enhanced Windows services file and V86 mode manager device services file into the assembly language source code file.

Similarly, the old NMI handler address may be obtained with the "Get_NMI_Handler_Addr" function of "VMMcall". Finally, the NMI vector may be hooked to the resume driver of the present invention by saving the old NMI handler address for later use, and then loading the address of a new NMI handler as the new NMI vector by using the "Set_N_MI Handler_Addr" of "VMMcall". The new handler address determines if the NMI is a resume NMI, and if so calls the device driver of the present invention. If not, control is transferred to the old NMI handler.

Step 112 involves converting the memory below the 1 MByte boundary previously allocated in step 107 from its virtual address to a physical address, and copying the routine which switches the mode of the microprocessor into the real mode into this memory space. This routine will subsequently be called at a later time to perform the actual switch to real mode.

Step 113 comprises the last step of the initialization sequence according to a preferred embodiment which is the hooking of an NMI event handler routine. Because (1) the NMI handler may only operate on local data in the resume device driver's initialization data segment, (2) the microprocessor may be in virtual, 386 protected, 286 protected, or real mode when an NMI is detected, and (2) the NMI handler may not call any Windows services, we must hook an NMI event handler to perform the actual run-time functionality of the present invention. The event request procedure is registered asynchronously and called back lust before the operating system's virtual machine manager (VMM) returns to the application. The NMI event handler is similar to a normal event handler except that the NMI event chain only needs to be hooked once, instead of scheduling an event every time. Thus, the new NMI handler routine of the present invention, as will be discussed in more detail below, only needs to detect that the N MI was caused by a resume request (e.g. by pressing the power switch 13 of FIG. 1), and set a variable which the NMI event handler of the resume driver of the present invention uses to perform the resume function. The NMI event handler may be hooked, as discussed above, by using the "Hook_NMI_Event" function of "VMMcall".

After the resume event processing routine is hooked in step 113, Windows may then perform any additional initialization sequences in accordance with its usual practices. Thus, at this point, the resume driver of the present invention has been completely loaded and installed, and an NMI detected by the microprocessor as a request to power-down the system while utilizing the resume function will initiate the run-time resume processing functionality of the present invention, as discussed in a preferred embodiment below with respect to FIGS. 2(c)-2(g).

Figure 2C:
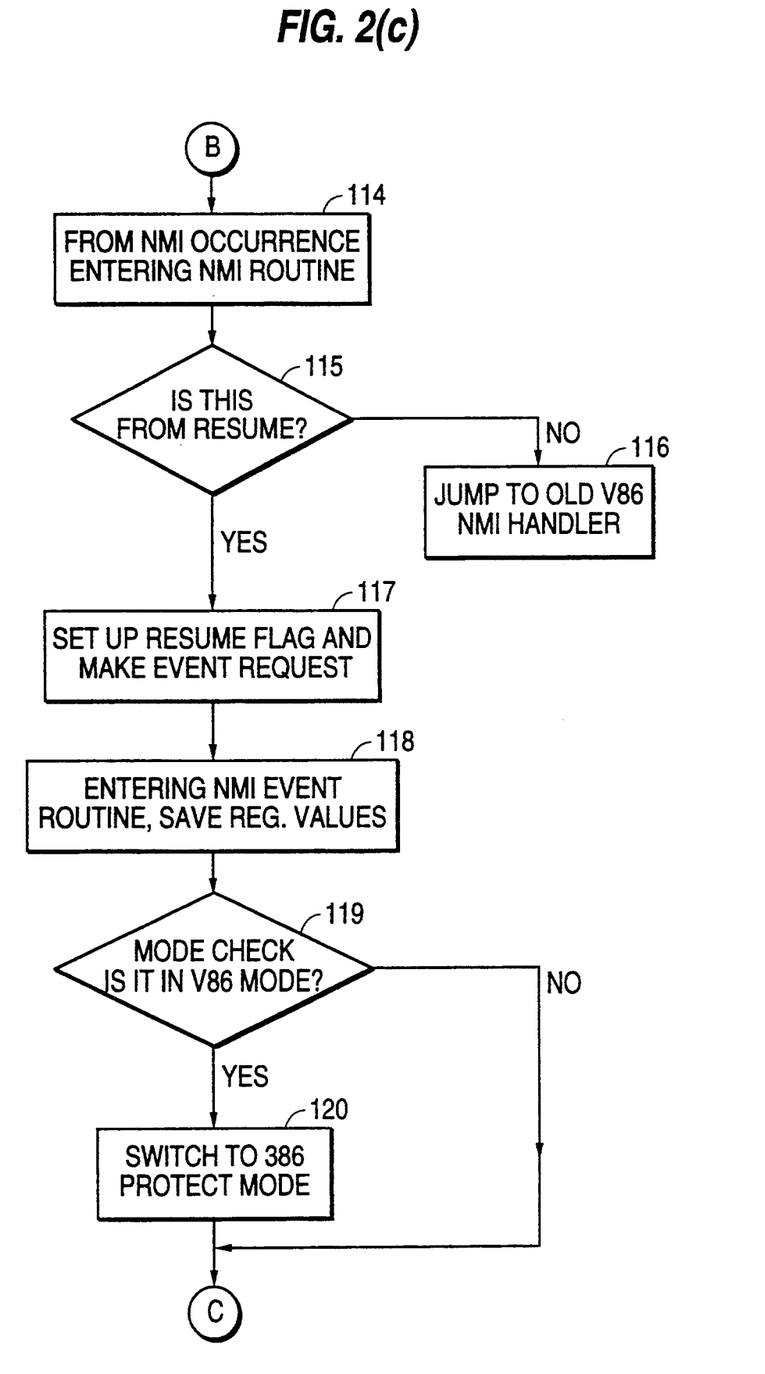

Referring to FIG. 2(c), step 114 is depicted as representing a situation where an NMI has been detected by the microprocessor (CPU 24 of FIG. 1). After the NMI has been detected, step 115 is encountered which makes a determination of whether the NMI was caused by the user requesting the resume function to be implemented. In a preferred embodiment when the Toshiba T3100SX laptop computer is utilized, this determination may be made by examining a byte input from the "Port B Read/Write Diag. register" (port 61 hex). In this case, if bit 7 is set, then the NMI was caused by an I/O channel check (parity) error, and the original NMI handler is jumped to (in step 116) so that the system may be appropriately halted.

If bit 7 is not set, then the NMI must be the result of a power-down request, and step 117 is encountered. Step 117 involves setting a special event processing resume flag and making an event request. After the event request is made, the resume NMI event processing routine ("event routine"), previously hooked in step 113, is encountered at step 118. The event routine first saves any register values that might be modified, in accordance with good programming technique, and then step 119 is encountered.

Step 119 involves determining whether the microprocessor is in its virtual 8086 mode or its 386 protected mode. These two modes comprise the two modes referred to as the enhanced modes of the 80386-compatible microprocessor. The mode of the microprocessor may be determined by utilizing the DOS Protected Mode Interface Version 0.9 ("DPMI") function of the "Exec_VxD_Int" function of "VMMcall". Specifically, the double-word value "2F" (hex) (e.g. the interrupt #) is pushed onto the stack before this call, and upon return, a value of 0 in the AX register indicates that the microprocessor is in the protected mode.

If the microprocessor is in the virtual 8086 mode, then the microprocessor is switched to 386 protected mode in step 120. This switch is accomplished because processor control registers may not be read and privileged instructions may not be executed while in the virtual mode. The protected mode entry point segment and the protected mode entry point offset (stored in the ES and EDI registers accordingly) are saved in previously defined memory locations. It is next determined if the mode switch needs a block of memory by examining the contents of the SI register. If the SI register contains zero (0), then the actual mode switch is performed, described below.

If the SI register contains anything but zero (0), then the segment and offset of a "mode switch buffer", which was set aside during assembly as 128 bytes containing zero values, is determined and placed into the AX register and EBX register accordingly. The EBX register is shifted right 4 bits (e.g. with the "SHR" instruction) in accordance with the segmenting scheme, incremented, BX is added to AX, and the result is moved into register ES.

At this point, the actual switch to protected mode is made. The contents of the AX register are cleared and previously saved protected mode entry point offset is called (e.g. using an instruction such as: "CALL DWORD PTR [PMODE_ENTER_OFF]", where "PMODE_ENTER_OFF" is the previously saved protected mode entry point offset. If the carry clear is not set, then the switch is successful.

After the switch to 80386 protected mode has been made, a resume processing routine is called, in a preferred embodiment, in step 107. This is necessary because the resume driver may not do any mode switching into real mode, as the real mode is not able to address memory locations above the 1 MByte boundary. Therefore, the actual steps necessary to switch the microprocessor into real mode, all of which will be described below, are executed from within a routine operating below the 1 MByte boundary.

Figure 2D:
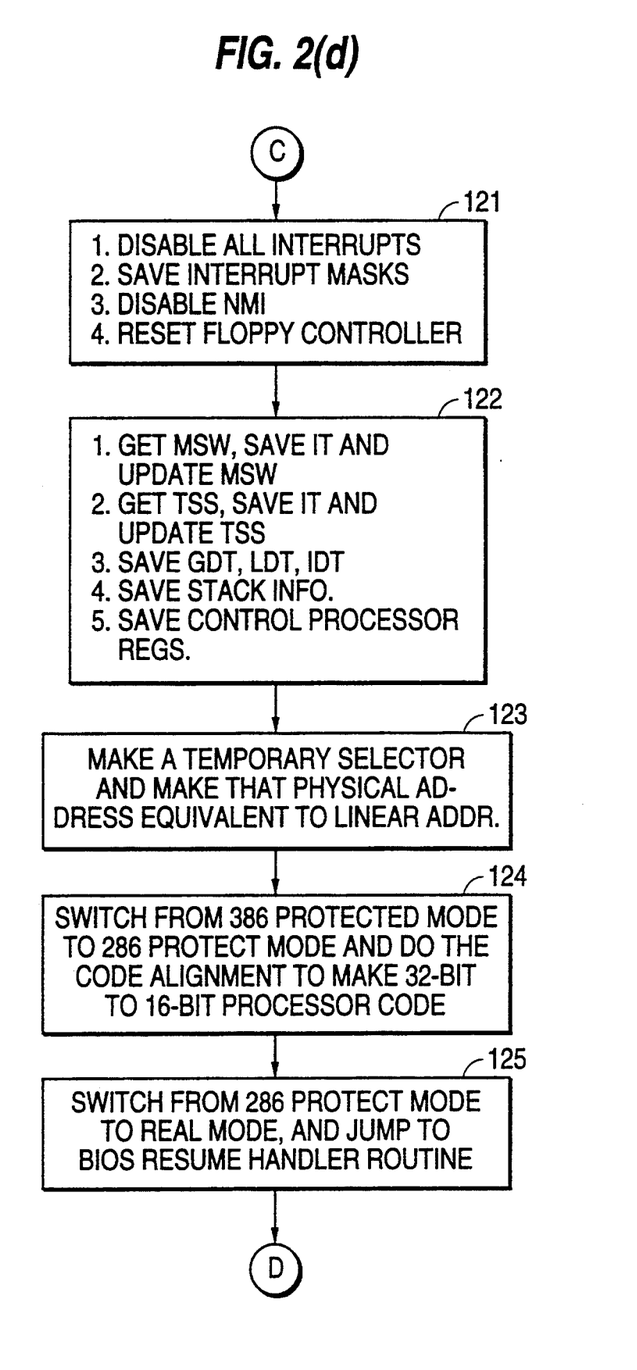

Step 121 consists of four general steps, as indicated below. First, interrupts are disabled with the "CLI" (Clear Interrupt Flag) instruction, and the "Begin_Next_Exec", "Disable_VM_Ints", and "End_Nest_Exec" functions of "VMMcall". Second, interrupt masks are saved into a predefined memory location for later use, and the mask pattern is disabled (via the interrupt mask port). Third, the NMI is disabled, and fourth, the floppy controller is reset.

Next, step 122 involves (1) obtaining the machine status word (MSW), saving it into a predefined memory location, and updating it by clearing the "MP" and "TS" bits, (2) obtaining the current TSS (Task state register), saving it into a predefined memory location, and turning the TSS busy bit off (3) obtaining the address of the global descriptor table (GDT) from the GDT register, the address of the local descriptor table (LDT) from the LDT register, and the address of the interrupt descriptor table (IDT) from the IDT register and saving them into respective predefined memory locations, (4) saving stack information into predefined memory locations, and (5) saving control processor registers into predefined memory locations.

Step 123 involves creating a temporary selector and making the physical address equivalent to the linear address. The temporary selector is used when the microprocessor mode is switched to real mode. The temporary selector is necessary because, except for base addresses, descriptor register values cannot be loaded in real mode. Therefore, 8086-compatible (real mode) attributes must be loaded into the data segment descriptor register before switching to real mode.

In addition, an equivalent descriptor for turning off the page mode bit must be allocated. This selector must also contain values that are 8086-compatible. Thus, the code that performs the switch to real mode must reside in a code segment whose descriptor has 8086-compatible attributes (namely, present=1, privilege level=0, limit=64K, granularity=0, default operand size=0, conforming=0, and readable=1). Because page mode is enabled, the code and data segments used to make the switch into real mode must have physical addresses that are identical to their linear addresses (e.g. the PTEs that map these segments must define an identity mapping). The identity mapping insures that instructions and operands fetched are from consistent physical addresses before and after paging is disabled.

In order to create a temporary selector in step 123, the "_BuildDescriptorDWORDs" and "_Allocate_GDT_Selector" functions of "VMMcall" must be utilized, with the resulting selector being stored in a predefined memory location. Likewise, the current GDT selector must be placed aside for further processing, as described below.

Step 124 refers to the start of the actual mode switching routine executed below the 1 MByte address boundary. First, the microprocessor is switched from 80386 protected mode to 80286 protected mode. Because at this point the microprocessor can only recognize 16-bit aligned 80286 code, the remaining code must be hard-coded before assembly so that the microprocessor can properly execute it when in the 80286 protected mode. In order to assure that the microprocessor continues execution at the right spot after this mode switch, the memory address of the next executable instruction may be "pushed" onto the stack, at which point the "RETF" instruction may be executed.

Step 125 consists of switching from 80286 protected mode to real mode. In addition, other functions, such as resetting disk drives and printer ports may be executed at this point. Once the microproteaser has been switched into real mode, control is passed to the BIOS resume handler address which was previously saved into a memory location.

Figure 2E:
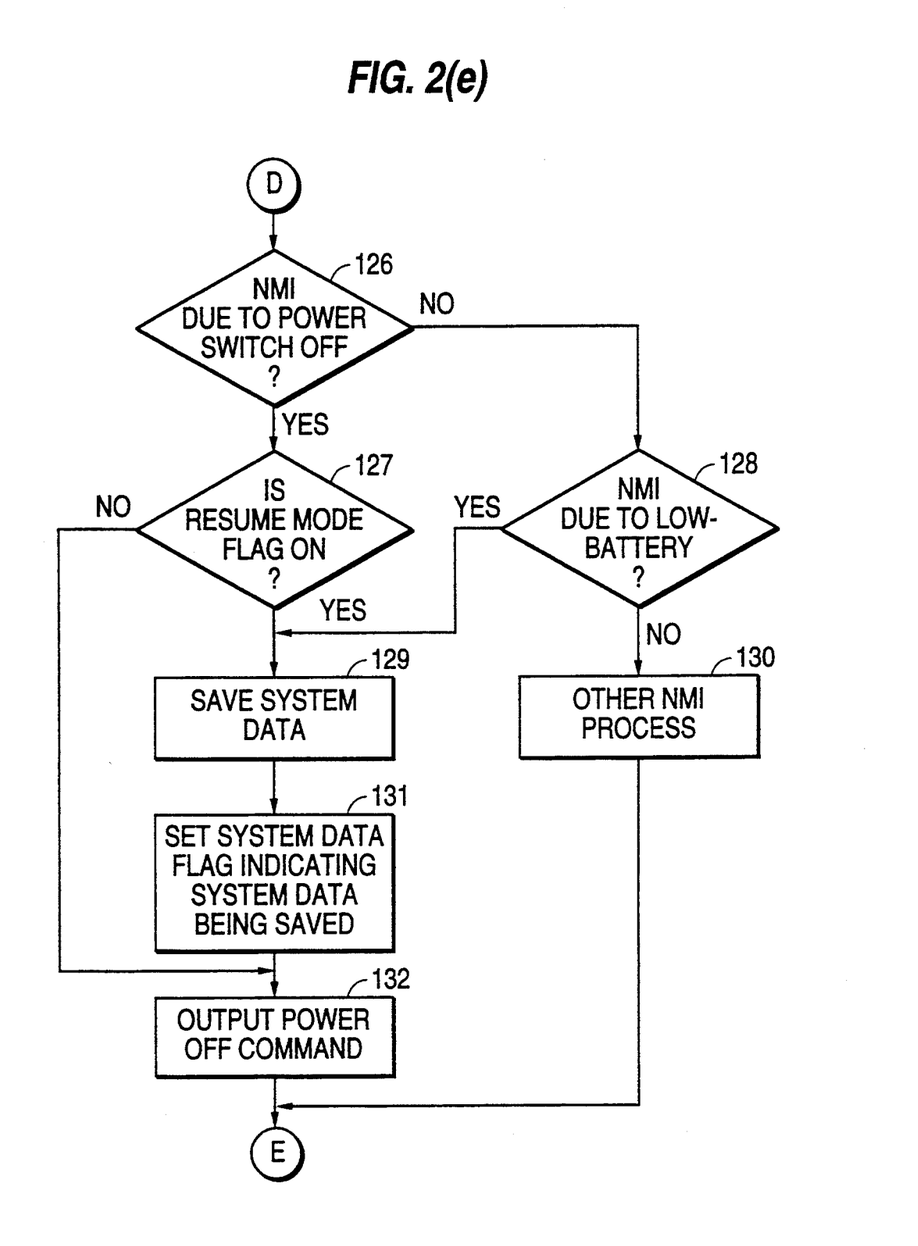

Steps 126-132 outline the basic steps which the BIOS resume handler takes before actually removing power to the computer system. Such steps are executed, in a preferred embodiment, by the resume BIOS in ROM in the computer system used in the present invention, such as the Toshiba T3100SX. In step 126, it is determined whether the NMI occurred as a result of the power-off switch (element 13 of FIG. 1) (the process of such determination being previously described). If not, then step 128 determines whether the NMI was generated due to a low battery condition. A low battery condition NMI is supplied to the computer system (element 11 in FIG. 1) via the "LOW BATTERY" line of FIG. 1. If not, then the resume BIOS assumes that the NMI was generated because of another condition (such as a parity error), and the appropriate steps are then taken in step 130. If the NMI is determined to be from a low battery condition in step 128, then step 127 (described below) is skipped, and control is transferred to step 129.

If the NMI is determined to be from the power-off switch in step 126, then step 127 is encountered. Step 127 makes a determination whether the resume mode flag is on, which would enable the resume process. If it is not on, then control is passed to step 132 (described below), and no BIOS resume functionality occurs. However, if the resume mode flag is on, then step 129 is next executed.

Step 129 consists of saving system data, such as the contents of registers, associated with the real mode of the microprocessor into the computer system's memory. Thereafter, step 131 consists of setting a system data flag in the memory of the computer system indicating that such data has been saved in step 129. After the power is subsequently restored to the computer system, this flag will be used to indicate that resume data was previously saved so that the resume BIOS may restore this data to the appropriate registers, etc.

Finally, step 132 is executed, either following from step 131 or step 127. Step 132 outputs an appropriate power-off command to the power supply control section (from element 5 to element 11 of FIG. 1, via the "OFF REQUEST" line), thereby instructing the power supply control section to remove power from all areas of the computer system (except, of course, the memory). At this point, the computer system is effectively shut down, and does not get powered back on until the user indicates to the power supply control section that the system is to be resumed.

Figure 2F:
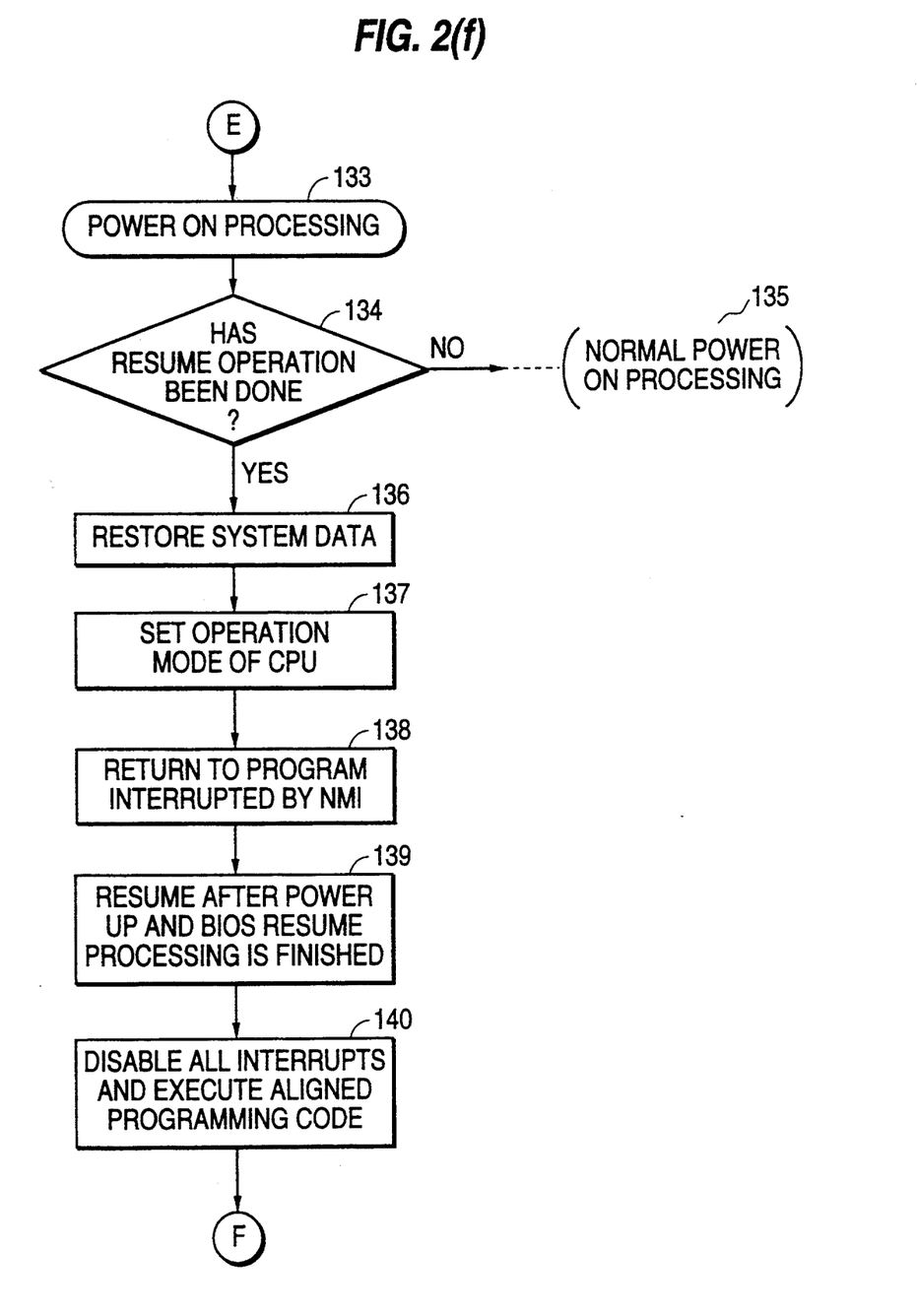

When the user of the computer system indicates to the power supply control section (via power switch 13 of FIG. 1) that the computer system is to be powered back on, then steps 133-138 are first encountered. These steps are taken by the resume BIOS routines which were executing before the power was removed. Step 133 simply indicates that power on processing has been initiated. Thereafter, step 134 makes the determination whether the resume processing operation was previously performed by the BIOS before power was removed. This determination may be simply made by checking the system data flag that was set in step 131 if the process of saving the system data (in step 129) was performed. If this flag is set, then steps 136-138 of the resume BIOS routine (and the remaining steps of the present invention) are performed. If this flag is not set, then the normal power on processing (e.g. the "boot" process) may be performed by the computer system.

If the resume flag was set by the resume BIOS, then step 136 is encountered. This step entails restoring the system data (such as registers, etc.) previously saved in step 129. Step 137 involves setting the operation mode of the microprocessor (CPU 24 in FIG. 1). Because the microprocessor should already be operating in the real mode, this step might be redundant. However, in order to be complete, and in order to prevent unintentional mode switching during the power down process, the mode of the microprocessor may be specifically set to the real mode in this step.

Step 138 consists of returning to the program interrupted by the NMI. In the case of the present invention, this entails returning control to the resume driver of the present invention. Because the resume processing routines in the BIOS have no idea that the resume driver of the present invention is acting as a "wrapper" around the BIOS in order to implement the resume functionality under the enhanced modes of the 80386, the resume BIOS "thinks" that it is passing control back to the program interrupted by an NMI. However, according to the present invention, control is actually passed back to the resume driver of the present invention, which performs its computer system status restoration before control is passed back to the program originally interrupted in the NMI.

Figure 2G:
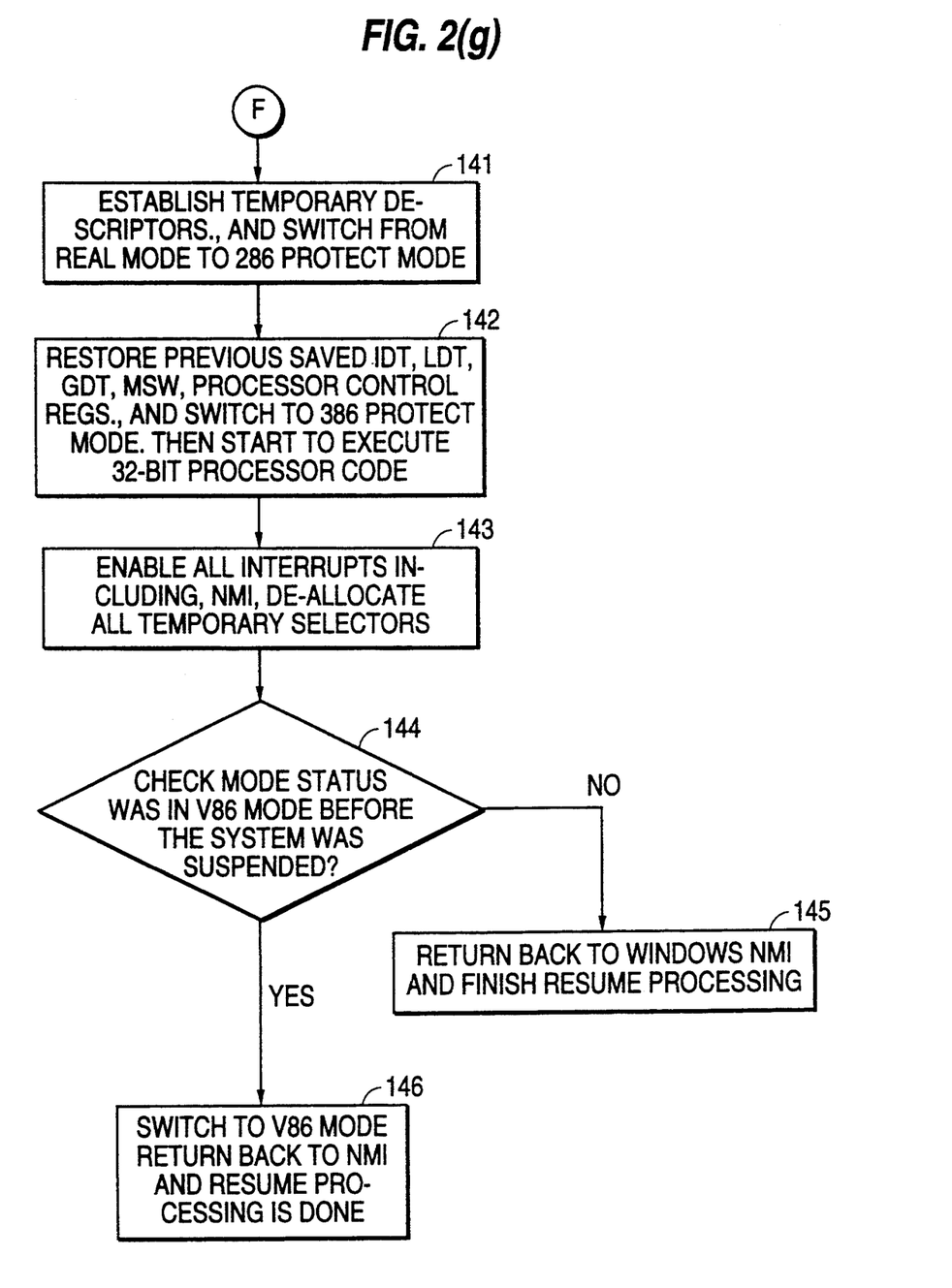

When the resume BIOS passes control back to the present invention, step 139 is encountered. Step 139 simply illustrates that the BIOS resume processing has completed. Step 140 entails disabling all interrupts and executing the previously executing 16-bit aligned programming code (described previously). At this point, additional functions may be performed, such as once again resetting disk drives and printer ports.

Step 141 consists of establishing temporary descriptors (while still in 16-bit aligned code) for use as described below. In addition, at this point, the microprocessor is switched from real mode to 80286 protected mode. The microprocessor cannot directly switch from real mode to 80386 protected mode because the descriptor tables of the microprocessor are in paged linear address space. Therefore, the microprocessor must necessarily switch from real mode to 80286 protected mode.

After step 141 is complete, and the microprocessor is back in 80286 protected mode, step 142 is executed. Step 142 entails restoring the previously saved interrupt descriptor table (IDT) register, local descriptor table (LDT) register, global descriptor table (GDT) register, machine status word (MSW), processor control registers, TSS, etc., which were previously saved into predefined memory locations in step 122. Also in this step, the microprocessor is switched to 80386 protected mode (32-bit flat mode code). In order to assure that execution is transferred to the appropriate instruction, a far jump to the selector:offset location of the next instruction (e.g. the first instruction corresponding to step 143) may be made. Because the microprocessor will be back in the 80386 32-bit flat protected mode at this point, the remaining instructions may be coded normally using regular assembler syntax, thus re-aligning the code back to the 32-bit state.

Also in step 142, the operating system's time may be updated by reading the current time and date from the computers CMOS, sequentially loading the "DOS_Update_Time" function (2D00 hex) and the "DOS_Update_Date" function (2B00 hex) into register AX, pushing the DOS service request (21 hex) onto the stack, and implementing the "VMMcall" calls for time and date update.

Step 143 involves enabling all previously disabled interrupts, including the NMI, and de-allocating all previously allocated temporary selectors. The de-allocation process may be performed with the "_Free_GDT_Selector" function of "VMMcall".

Finally, step 144 makes the determination whether the microprocessor was originally in the virtual 8086 mode when the NMI was first detected. This determination is made based upon the flag set in step 120. If the microprocessor was, in fact, originally in the virtual mode, then step 146 is encountered. Otherwise, step 145 is encountered.

Specifically, step 146 consists of switching the microprocessor's mode back to the virtual mode and then returning control back to the program which was executing before the original NMI was detected. In a preferred embodiment using the T3100SX computer system, the microprocessor's mode may be switched back to virtual mode by loading the "DPM" function (e.g. 0306 hex) into register AX, pushing the "DPM" function (double word 31 hex) onto the stack, and calling the "Exec_VxD_Int" function of "VMMcall". On the other hand, step 145 consists of immediately returning control back to the program which was originally interrupted by the NMI.

In another embodiment of the present invention, the process of switching from the enhanced mode of the microprocessor, to the real mode, and then back to the enhanced mode is provided to accomplish a functionality for use with applications other than the resume function. For example, any other application which by necessity must be performed in the real mode of the microprocessor could be implemented according to the present invention. In this case, a computer program operating in the enhanced movie of a microprocessor (e.g. the Intel 80386) may utilize the present invention to switch into the real mode, at which point the application which is able to operate in only the real mode is executed. After the application has completed its execution, the present invention is able to switch the operational mode of the microprocessor back to the enhanced mode (to either the 80386 protected mode or the virtual 8086 mode, depending upon which was originally active), and the original computer program may continue its execution. Thus, one of ordinary skill in the art will understand that the present invention is not limited to application with a resume function, but may be easily adapted to a multitude of situations.

As can be seen from this detailed description, a preferred embodiment has been described for implementing the present invention on a Toshiba laptop computer, such as the T3100SX or T2000SX. However, as will be apparent from one of ordinary skill in the art of computer programming and/or computer hardware design, the present invention could, just as easily, be implemented on any computer system having an advanced microprocessor, an intelligent power supply circuit, and a preexisting resume processing function for the basic "real" mode of the microprocessor. In addition, the specific ordering of the various steps described previously is largely a matter of discretion, and except for where otherwise noted, may be ordered in a multitude of ways. Finally, while the preferred embodiment of the present invention was designed to operate under the Microsoft Windows Version 3.0 environment, a resume driver could be designed for use with any other advanced operating system, such as UNIX, etc., and any other advanced microprocessor, such as the Motorola 680×0, etc., by simply modifying the appropriate types of data associated with the operating system and/or microprocessor stored and retrieved in the various steps of the present invention.

What is claimed is:

1. In a computer system having a system memory and a central processing unit (CPU) operable in an enhanced mode and in a real mode, a method of saving an operational state of the CPU corresponding to the enhanced mode prior to a power-down of the computer system, comprising the steps of:
   (a) receiving, while in the enhanced mode, a power-down request to power down the computer system;
   (b) actuating, in response to said step (a), a resume processing module residing in the system memory for saving operational states and switching modes, accessible to the CPU during operation in the real mode;
   (c) saving the operational state of the enhanced mode using said resume processing module;
   (d) switching from the enhanced mode to the real mode using said resume processing module;
   (e) performing a controlled power-off sequence.

2. The method of claim 1, wherein steps (a)–(d) are performed responsive to a non-maskable interrupt being detected by the CPU.

3. The method of claim 1, wherein said enhanced mode corresponds to a virtual 8086 mode of said CPU.

4. The method of claim 3, wherein step (g) comprises the steps of:
   (i) enabling said interrupts associated with said CPU,
   (ii) switching from the real mode to a second intermediate operational mode,
   (iii) switching from said second intermediate operational mode to said first intermediate operational mode,
   (iv) switching from said first intermediate operational mode to the enhanced mode, and
   (v) aligning said plurality of instructions executing on said CPU responsive to step (iii).

5. The method of claim 4, wherein said first intermediate operational mode corresponds to an 80386 protected mode of said CPU.

6. The method of claim 4, wherein said second intermediate operational mode corresponds to an 80286 protected mode of said CPU.

7. The method of claim 3, wherein step (d) comprises the steps of:
   (i) switching from the enhanced mode to a first intermediate operational mode,
   (ii) switching from said first intermediate operational mode to a second intermediate operational mode,
   (iii) aligning said plurality of instructions executing on said CPU responsive to step (ii), and
   (iv) switching from said second intermediate operational mode to the real mode.

8. The method of claim 7, wherein said first intermediate operational mode corresponds to an 80386 protected mode of said CPU.

9. The method of claim 7, wherein said second intermediate operational mode corresponds to an 80286 protected mode of said CPU.

10. The method of claim 1, further comprising the steps of:
    (f) receiving a power-on indication;
    (g) switching from the real operational mode to the enhanced mode; and
    (h) restoring said operational state of the enhanced mode saved in said step (c).

11. The method of claim 10, wherein step (g) comprises the steps of:
    (i) enabling said interrupts associated with said CPU,
    (ii) switching from the real mode to an intermediate operational mode,
    (iii) switching from said intermediate operational mode to the enhanced mode, and
    (iv) aligning said plurality of instructions executing on said CPU responsive to step (iii).

12. The method of claim 11, wherein said intermediate operational mode corresponds to an Intel 80286 protected mode of said CPU.

13. The method of claim 10, wherein step (h) comprises the steps of:

(i) restoring a task state register and a machine status register, said registers being associated with the enhanced mode of said CPU and being previously saved in step (c), (ii) restoring a global descriptor table register, a local descriptor table register, and an interrupt descriptor table register, said descriptor tables being associated with the enhanced mode of said CPU and being previously save in step (c), (iii) restoring registers associated with a stack, said stack being associated with the enhanced mode of said CPU and said registers being previously saved in step (c), and (iv) restoring processor control registers, said processor control registers being associated with the enhanced mode of said CPU and being previously saved in step (c).

14. The method of claim 1, wherein step (d) comprises the steps of:

(i) switching from the enhanced mode to an intermediate operational mode, (ii) aligning said plurality of instructions executing on said CPU responsive to step (i), and (iii) switching from said intermediate operational mode to the real mode.

15. The method of claim 14, wherein said intermediate operational mode corresponds to an Intel 80286 protected mode of said CPU.

16. The method of claim 1, wherein step (c) comprises the steps of:

(i) disabling interrupts associated with said CPU, (ii) saving a task state register and a machine status register, said registers being associated with the enhanced mode of said CPU, (iii) saving a global descriptor table register, a local descriptor table register, and an interrupt descriptor table register, said descriptor tables being associated with the enhanced mode of said CPU, (iv) saving registers associated with a stack, said stack being associated with the enhanced mode of said CPU, (v) saving processor control registers, said processor control registers being associated with the enhanced mode of said CPU.

17. The method of claim 1, wherein said CPU is an Intel 80386-compatible microprocessor.

18. The method of claim 1, wherein said enhanced mode corresponds to an 80386 protected mode of said CPU.

19. The method of claim 1, further comprising the steps, prior to said step (a), of:

(i) allocating a block of memory located below a 1 MByte boundary associated with said CPU for use by said resume processing module, (ii) copying said resume processing module to said block of memory.

20. The method of claim 1, wherein step (a) is performed responsive to a non-maskable interrupt being detected by said CPU.

21. The method of claim 1, wherein said CPU is operating under the Microsoft Windows environment.

22. The method of claim 1, wherein said resume processing module is a Microsoft Windows device driver.

23. The method of claim 1, further comprising the step prior to said step (a) of allocating system memory in an address area accessible to the CPU while operating in the real mode.

24. The method of claim 1, wherein said step (c) further comprises the step of saving the operational state of the enhanced mode in system memory.

25. The method of claim 1, further comprising the step (d) after step of saving the state of the real mode.

26. In a computer system having a system memory and a central processing unit (CPU) operable in an enhanced mode and in a real mode, said CPU being able to execute a plurality of instructions and wherein said enhanced and real modes utilize different memory addressing and data register schemes, a method of switching from the enhanced mode to the real mode, and subsequently switching back to the enhanced mode, said mode switching method comprising the steps of:

(a) saving an operational state of the enhanced mode, (b) switching from the enhanced mode to the real mode, (c) executing a resume processing program, residing in system memory, designed to operate in the real mode and be accessible to the CPU during operation in the real mode, (d) switching from the real mode to the enhanced mode, (e) performing a controlled power-off sequence, and (f) restoring said operational state of the enhanced mode saved in step (a).

27. A computer system having a system memory and a central processing unit (CPU) operable in an enhanced mode and in a real mode capable of saving an operational state of the CPU corresponding to the enhanced mode prior to a power-down of the computer system, comprising:

power-down detection means for receiving, while in the enhanced mode, a power-down request to power down the computer system;

actuation means for actuating, in response to said power-down detection means, a resume processing module residing in the system memory for saving operational states and switching modes, accessible to the CPU during operation in the real mode;

state saving means, responsive to said power-down detection means, for saving the operational state of the enhanced mode using said resume processing module;

a processor mode switcher for switching the CPU from the enhanced mode to the real mode using said resume processing module; and power-down means for performing a controlled power-off sequence in response to said processor mode switcher.

28. The computer system of claim 27, wherein said process mode switcher switches the CPU from the real mode to the enhanced mode upon receipt of a power-on indication.

29. The computer system of claim 28, further comprising state restoration means for restoring said operational state of the enhanced mode saved by said state saving means.

30. The computer system of claim 27, wherein said power-down detection means is activated in response to a non-maskable interrupt being detected by the CPU.

31. A computer implemented system having a system memory and a central processing unit (CPU) operable in an enhanced mode and in a real mode for saving an operational state of the CPU corresponding to the enhanced mode prior to a power-down of the computer system and for subsequently restoring the state of the CPU corresponding to the enhanced mode, comprising:

state saving means for saving the operational state of the enhanced mode;

a processor mode switcher, responsive to said state saving means, for switching the CPU from the enhanced mode to the real mode;

a resume processing program residing in system memory, responsive to said processor mode switcher, designed to operate in the real mode and be accessible to the CPU during operation in the real mode, said processor mode switching means for switching from the real mode to the enhanced mode, and state restoration means for restoring said operational state of the enhanced mode saved by said state saving means.

* * * * *